United States Patent
Yamanaka (10) Patent No.: US 12,343,821 B2
(45) Date of Patent: Jul. 1, 2025

(54) PROCESSING EQUIPMENT

(71) Applicant: DISCO CORPORATION, Tokyo (JP)

(72) Inventor: Satoshi Yamanaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 290 days.

(21) Appl. No.: 18/332,926

(22) Filed: Jun. 12, 2023

(65) Prior Publication Data

US 2023/0405738 A1    Dec. 21, 2023

(30) Foreign Application Priority Data

Jun. 20, 2022  (JP) ................ 2022-098906

(51) Int. Cl.
*B23K 37/04* (2006.01)
*B23K 26/36* (2014.01)

(52) U.S. Cl.
CPC .......... *B23K 37/0408* (2013.01); *B23K 26/36* (2013.01)

(58) Field of Classification Search
CPC .. B23K 37/04; B23K 37/0408; B23K 37/047; B23K 26/36; B23K 26/0622; B23K 26/0648; B23K 26/53
See application file for complete search history.

(56) References Cited

FOREIGN PATENT DOCUMENTS

| CN | 107363694 A | * | 11/2017 | ......... B24B 27/0076 |
| CN | 107825191 A | * | 3/2018 | ............ B23Q 3/062 |
| JP | 2014124701 A | | 7/2014 | |

* cited by examiner

*Primary Examiner* — Jason L Vaughan
*Assistant Examiner* — Amanda Kreiling
(74) *Attorney, Agent, or Firm* — Greer Burns & Crain Ltd.

(57) ABSTRACT

Processing equipment includes a processing apparatus including a chuck table, a suction apparatus supplying a negative pressure to the chuck table, a first base that supports the processing apparatus, and a second base that supports the suction apparatus. The second base has, at a bottom part thereof, multiple leg parts that are disposed in such a manner as to penetrate through through-holes provided in the first base, without getting contact with the first base, and are each capable of extension and contraction. The second base is allowed to be supported by the first base through contracting of each of the multiple leg parts when the processing and suction apparatuses are to be conveyed. The second base stands by itself without getting contact with the first base, through extending of each of the multiple leg parts when the processing and suction apparatuses are to be installed on a floor surface.

3 Claims, 6 Drawing Sheets

PROCESSING EQUIPMENT

BACKGROUND OF THE INVENTION

Field of the Invention

The present invention relates to processing equipment including a processing apparatus and a suction apparatus, the processing apparatus including a chuck table that holds a workpiece under suction and a processing unit that processes the workpiece held under suction by the chuck table, the suction apparatus supplying a negative pressure to the chuck table.

Description of the Related Art

In a manufacturing process of semiconductor device chips, after multiple devices are formed on a front surface of a wafer such as a single-crystal silicon substrate, thinning of the wafer by grinding a back surface side of the wafer is executed in order to eventually manufacture the semiconductor device chips having a target thickness. A grinding apparatus is used for thinning a wafer. The grinding apparatus has a circular plate-shaped chuck table that can rotate while holding the wafer under suction. The chuck table has a frame body of a circular plate shape, and a porous plate of a circular plate shape is secured to a circular plate-shaped recessed part formed at a central part of the frame body.

An upper surface of the frame body and an upper surface of the porous plate are substantially flush with each other and function as a holding surface for holding the wafer thereon under suction. A suction apparatus such as a vacuum pump installed separately from the grinding apparatus is connected to the porous plate through a conduit part (for example, refer to Japanese Patent Laid-open No. 2014-124701). A negative pressure generated by the suction apparatus is transmitted to the porous plate through the conduit part. In general, the grinding apparatus and the suction apparatus are independently bought or sold, conveyed, installed, and so forth as individual apparatuses. However, when the grinding apparatus is used, the suction apparatus also becomes necessary. When the grinding apparatus and the suction apparatus are separately packed and conveyed, it takes more time and effort compared with the case of integrally packing and conveying both. Moreover, at the time of start-up of the grinding apparatus, connection work of properly connecting the grinding apparatus and the suction apparatus with use of conduit parts, electrical wiring lines, and so forth is necessary.

In contrast, if the grinding apparatus and the suction apparatus are packed and conveyed in a state in which the suction apparatus is disposed in the grinding apparatus and is secured to the grinding apparatus and in which the grinding apparatus and the suction apparatus are properly connected with use of conduit parts, electrical wiring lines, and so forth, then the connection work can be omitted and the time and effort of packing can also be reduced. However, there is a problem that, when the suction apparatus is operated in the state in which the suction apparatus is disposed in the grinding apparatus and secured to the grinding apparatus, vibrations generated in the suction apparatus are transmitted to the grinding apparatus and a defect such as breakage or chipping occurs in a wafer ground by the grinding apparatus.

SUMMARY OF THE INVENTION

The present invention has been made in view of such a problem and intends to reduce vibrations transmitted from a suction apparatus to a processing apparatus such as a grinding apparatus when the suction apparatus is disposed in the processing apparatus.

In accordance with an aspect of the present invention, there is provided processing equipment including a processing apparatus, a suction apparatus, a first base that supports the processing apparatus, and a second base that supports the suction apparatus, the processing apparatus including a chuck table that holds a workpiece under suction and a processing unit that processes the workpiece held under suction by the chuck table, the suction apparatus supplying a negative pressure to the chuck table. The second base has, at a bottom part thereof, multiple leg parts that are disposed in such a manner as to penetrate through through-holes provided in the first base, without getting contact with the first base, and are each capable of extension and contraction. The second base is allowed to be supported by the first base through contracting of a protrusion length of each of the multiple leg parts when the processing apparatus and the suction apparatus are to be conveyed. The second base stands by itself without getting contact with the first base, through extending of the protrusion length of each of the multiple leg parts when the processing apparatus and the suction apparatus are to be installed on a floor surface.

Preferably, each of the multiple leg parts has a shaft part in which a spiral groove is formed, and rotating each shaft part allows a change in protrusion length of each shaft part.

Further, preferably, the processing unit has a spindle and processes the workpiece held under suction by the chuck table, with use of a processing tool mounted to the spindle, or the processing unit has a laser beam irradiation unit and processes the workpiece held under suction by the chuck table, by irradiating the workpiece with a laser beam.

The processing equipment according to the aspect of the present invention includes the first base that supports the processing apparatus and the second base that supports the suction apparatus. The second base has at the bottom part thereof the multiple leg parts that can each extend and contract. When the processing apparatus and the suction apparatus are to be conveyed, the second base can be supported by the first base through contracting of the protrusion length of each leg part of the second base. In contrast, when the processing apparatus and the suction apparatus are to be installed on the floor surface, the second base stands by itself without getting contact with the first base, through extending of the protrusion length of each leg part of the second base. Moreover, each leg part of the second base installed on the floor surface is disposed in such a manner as to penetrate through the through-hole formed in the first base without getting contact with the first base. Therefore, vibrations transmitted from the suction apparatus to the processing apparatus can be reduced.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
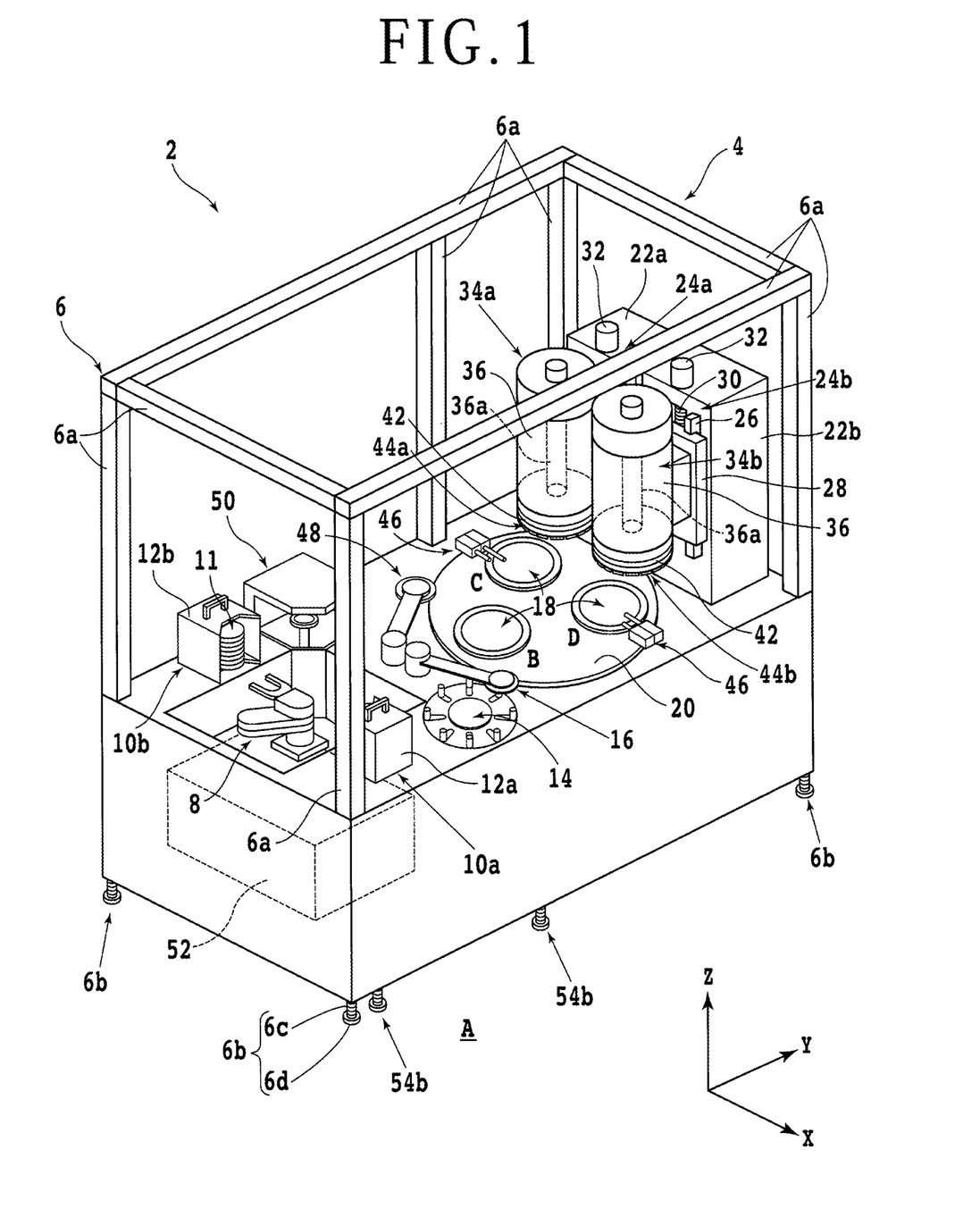
FIG. 1 is a perspective view of grinding equipment.

An embodiment according to one aspect of the present invention will be described with reference to the accompanying drawings. FIG. 1 is a perspective view of grinding equipment (processing equipment) 2. An X-axis direction (left-right direction), a Y-axis direction (front-rear direction), and a Z-axis direction (grinding feed direction, upward-downward direction, or height direction) illustrated in FIG. 1 are orthogonal to one another. The grinding equipment 2 has a grinding apparatus (processing apparatus) 4 for grinding (processing) a wafer (workpiece) 11.

The constituent elements of the grinding apparatus 4 are supported by a first base 6 formed by assembling framework pieces 6a into a rectangular parallelepiped shape. An exterior cover, a door part, and so forth for configuring a casing are disposed at a side part and a top part of the first base 6. In FIG. 1, however, the exterior cover, the door part, and so forth disposed in substantially an upper half of the first base 6 are omitted.

A leg part 6b is disposed at each of four corners of a bottom part of the first base 6. The leg part 6b has a shaft part 6c having a side surface in which a spiral groove is formed. A circular plate-shaped pedestal part 6d that gets contact with a floor surface A in a room such as a clean room is secured to a bottom part of the shaft part 6c. The shaft parts 6c are rotatably coupled to screw holes (not illustrated) formed in the framework pieces 6a. The height of the first base 6 relative to the floor surface A can be adjusted by rotating the shaft parts 6c. The number of leg parts 6b may be equal to or larger than five.

A robot arm 8 of a horizontal multi-joint type that conveys the wafer 11 is disposed on the front side (one side in the Y-axis direction) in a first space having a rectangular parallelepiped shape defined by the first base 6. Cassette disposing regions 10a and 10b exist on both sides of the robot arm 8 in the X-axis direction. A cassette 12a in which one or more wafers 11 can be housed is disposed on the cassette disposing region 10a, and another cassette 12b in which one or more wafers 11 can be housed is disposed on the cassette disposing region 10b.

The wafer 11 has a predetermined diameter (for example, approximately 200 mm) and mainly includes single-crystal silicon. Multiple planned dividing lines (streets) are set in a lattice manner on a front surface side of the wafer 11. A device (not illustrated) such as an integrated circuit (IC) is formed in each of rectangular regions marked out by the multiple planned dividing lines. Meanwhile, devices are not formed on a back surface side of the wafer 11. There is no limit on the kind, quantity, shape, structure, size, arrangement, and so forth of the devices formed on the wafer 11. The wafer 11 may not have any devices formed thereon. Further, there is no limit on the kind, material, size, shape, structure, and so forth of the wafer 11.

A position adjustment mechanism 14 is disposed on the rear side (the other side in the Y-axis direction) of the cassette 12a. The wafer 11 housed in the cassette 12a is conveyed to the position adjustment mechanism 14 by the robot arm 8 and is positioned to a predetermined position by the position adjustment mechanism 14. A base end part of a loading arm 16 that conveys the wafer 11 is disposed at a position adjacent to the position adjustment mechanism 14 in the X-axis direction. The loading arm 16 includes at a tip part thereof a suction pad that holds the wafer 11 under suction.

The loading arm 16 holds under suction the wafer 11, for which position adjustment has been executed by the position adjustment mechanism 14, by the suction pad and then pivots around its rotating shaft located at the base end part to convey the wafer 11 to a chuck table 18 disposed at a carrying-in/carrying-out position B. A turntable 20 having a circular plate shape is disposed on the rear side of the loading arm 16. A rotational drive source (not illustrated) such as a motor is coupled to a lower part of the turntable 20. The rotational drive source rotates the turntable 20 around a rotating shaft substantially parallel to the Z-axis direction.

On the turntable 20, three chuck tables 18 each of which holds the wafer 11 under suction are disposed at substantially equal intervals along a circumferential direction of the turntable 20. Each chuck table 18 is positioned to the carrying-in/carrying-out position B, a rough grinding position C, and a finish grinding position D by rotation of the turntable 20. For example, one chuck table 18 located at the carrying-in/carrying-out position B is positioned to the rough grinding position C when the turntable 20 is rotated clockwise by 120 degrees in top view. Subsequently, this chuck table 18 is positioned to the finish grinding position D when the turntable 20 is rotated clockwise by further 120 degrees in top view, and thereafter, is returned to the carrying-in/carrying-out position B when the turntable 20 is rotated counterclockwise by 240 degrees in top view.

Each chuck table 18 has a circular plate-shaped frame body formed of a non-porous ceramic. A recessed part having a circular plate shape is formed in an upper part of the frame body, and a circular plate-shaped porous plate which is formed of a porous ceramic and has an outer diameter substantially the same as an inner diameter of the recessed part is secured to this recessed part. The porous plate is connected to a suction apparatus 52 to be described later through a flow path (not illustrated) formed in the frame body and a conduit part (not illustrated) connected to the frame body. A negative pressure generated in the suction apparatus 52 is transmitted to the porous plate.

An upper surface of the porous plate and an upper surface of the frame body are substantially flush with each other and function as a holding surface for holding the wafer 11 thereon under suction. The holding surface has a circular cone shape that slightly protrudes in the center compared to an outer circumference edge. However, the amount of protrusion of the holding surface is as very small as, for example, 20 μm. A rotating shaft of the chuck table 18 is slightly tilted with respect to the Z-axis direction, and part of the holding surface and a grinding surface defined by lower surfaces of multiple grinding abrasive stones to be described later are disposed substantially in parallel to each other. A rotational drive source (not illustrated) such as a motor is coupled to the rotating shaft, and the chuck table 18 can rotate around this rotating shaft.

A first support structure 22a having a column shape is disposed on the rear side of the rough grinding position C, and a first grinding feed unit 24a is disposed on a front surface side of the first support structure 22a. Similarly, a second support structure 22b having a column shape is disposed on the rear side of the finish grinding position D, and a second grinding feed unit 24b is disposed on a front surface side of the second support structure 22b. Each of the first grinding feed unit 24a and the second grinding feed unit 24b includes a pair of guide rails 26 disposed substantially in parallel to the Z-axis direction. A moving plate 28 is attached to the pair of guide rails 26 slidably along the guide rails 26.

A nut part (not illustrated) is disposed on the rear side of the moving plate 28, and a screw shaft 30 disposed substantially in parallel to the guide rails 26 is rotatably coupled to this nut part with an interposition of multiple balls (not illustrated). A motor 32 such as a stepping motor is coupled to an upper end part of the screw shaft 30. When the screw shaft 30 is rotated by the motor 32, the moving plate 28 moves along the Z-axis direction.

A rough grinding unit (processing unit) 34a for executing rough grinding for the wafer 11 is secured to a front surface side of a moving plate (not illustrated) of the first grinding feed unit 24a. Similarly, a finish grinding unit (processing unit) 34b for executing finish grinding for the wafer 11 is secured to a front surface side of the moving plate 28 of the second grinding feed unit 24b. The rough grinding unit 34a and the finish grinding unit 34b each have a circular cylindrical spindle housing 36. Part of a circular columnar spindle 36a disposed along the Z-axis direction is housed inside the spindle housing 36.

A motor (not illustrated) such as a servomotor is disposed near an upper end part of the spindle 36a. A lower end part of the spindle 36a protrudes downward relative to a lower end of the spindle housing 36. A central part of an upper surface of a mount 42 having a circular plate shape is secured to the lower end part of the spindle 36a. A rough grinding wheel (processing tool) 44a is mounted on a lower surface side of the mount 42 of the rough grinding unit 34a. The rough grinding wheel 44a includes an annular base with a diameter substantially the same as that of the mount 42. On a lower surface side of the annular base, multiple rough grinding abrasive stones each having a substantially rectangular parallelepiped shape are disposed at substantially equal intervals along a circumferential direction of the annular base. The rough grinding abrasive stones are formed by securing abrasive grains formed of diamond, cubic boron nitride (cBN), or the like, with use of a bond material of metal, resin, a vitrified material, or the like.

A finish grinding wheel (processing tool) 44b is mounted on a lower surface side of the mount 42 of the finish grinding unit 34b. The finish grinding wheel 44b is substantially the same as the rough grinding wheel 44a. However, on an annular base of the finish grinding wheel 44b, multiple finish grinding abrasive stones each having an average grain diameter smaller than an average grain diameter of the abrasive grains of the rough grinding abrasive stones are disposed at substantially equal intervals along a circumferential direction of the annular base.

A grinding wafer supply nozzle (not illustrated) that supplies grinding water such as purified water is disposed directly under each of the rough grinding unit 34a and the finish grinding unit 34b. Further, thickness measuring instruments 46 that measure the thickness of the wafer 11 at the time of grinding are disposed near the respective chuck tables 18 disposed at the rough grinding position C and the finish grinding position D.

In the case of executing rough grinding, first, the front surface side of the wafer 11 is held under suction by the chuck table 18 disposed at the carrying-in/carrying-out position B. Thereafter, the turntable 20 is rotated to move this chuck table 18 to the rough grinding position C. Processing feed of the rough grinding unit 34a to the lower side is executed while the chuck table 18 and the spindle 36a of the rough grinding unit 34a are respectively rotated at a predetermined rotation speed. When the grinding surface defined by the lower surfaces of the multiple rough grinding abrasive stones that rotate around the spindle 36a gets contact with the back surface side of the wafer 11, the back surface side is subjected to rough grinding by the rough grinding wheel 44a. During the rough grinding, the grinding water is supplied to a processing region in which the wafer 11 is in contact with the rough grinding abrasive stones. After the rough grinding, the chuck table 18 at the rough grinding position C is moved to the finish grinding position D.

Thereafter, processing feed of the finish grinding unit 34b to the lower side is executed while the chuck table 18 and the spindle 36a of the finish grinding unit 34b are respectively rotated at a predetermined rotation speed. When the grinding surface defined by the lower surfaces of the multiple finish grinding abrasive stones that rotate around the spindle 36a gets contact with the back surface side of the wafer 11, the back surface side is subjected to finish grinding by the finish grinding wheel 44b. During the finish grinding, the grinding water is supplied to a processing region in which the wafer 11 is in contact with the finish grinding abrasive stones.

An unloading arm 48 is disposed at a position adjacent to the loading arm 16 in the X-axis direction. The unloading arm 48 has a suction pad that holds the wafer 11 under suction. The unloading arm 48 holds under suction by the suction pad the wafer 11 on the chuck table 18 disposed at the carrying-in/carrying-out position B after the finish grinding, and conveys the wafer 11 to a cleaning unit 50.

The cleaning unit 50 has a spinner table that holds the wafer 11 under suction. A cleaning nozzle that supplies purified water and an air nozzle that supplies drying air are disposed near the spinner table. The wafer 11 for which spinner cleaning and drying have been executed by the cleaning unit 50 is conveyed by the robot arm 8 and is housed in the original cassette 12a. A negative pressure is supplied from the suction apparatus 52 to the respective suction pads of the above-described chuck tables 18, loading arm 16, and unloading arm 48, and so forth. The suction apparatus 52 has a suction source (not illustrated) such as a vacuum pump that generates the negative pressure.

Figure 2:
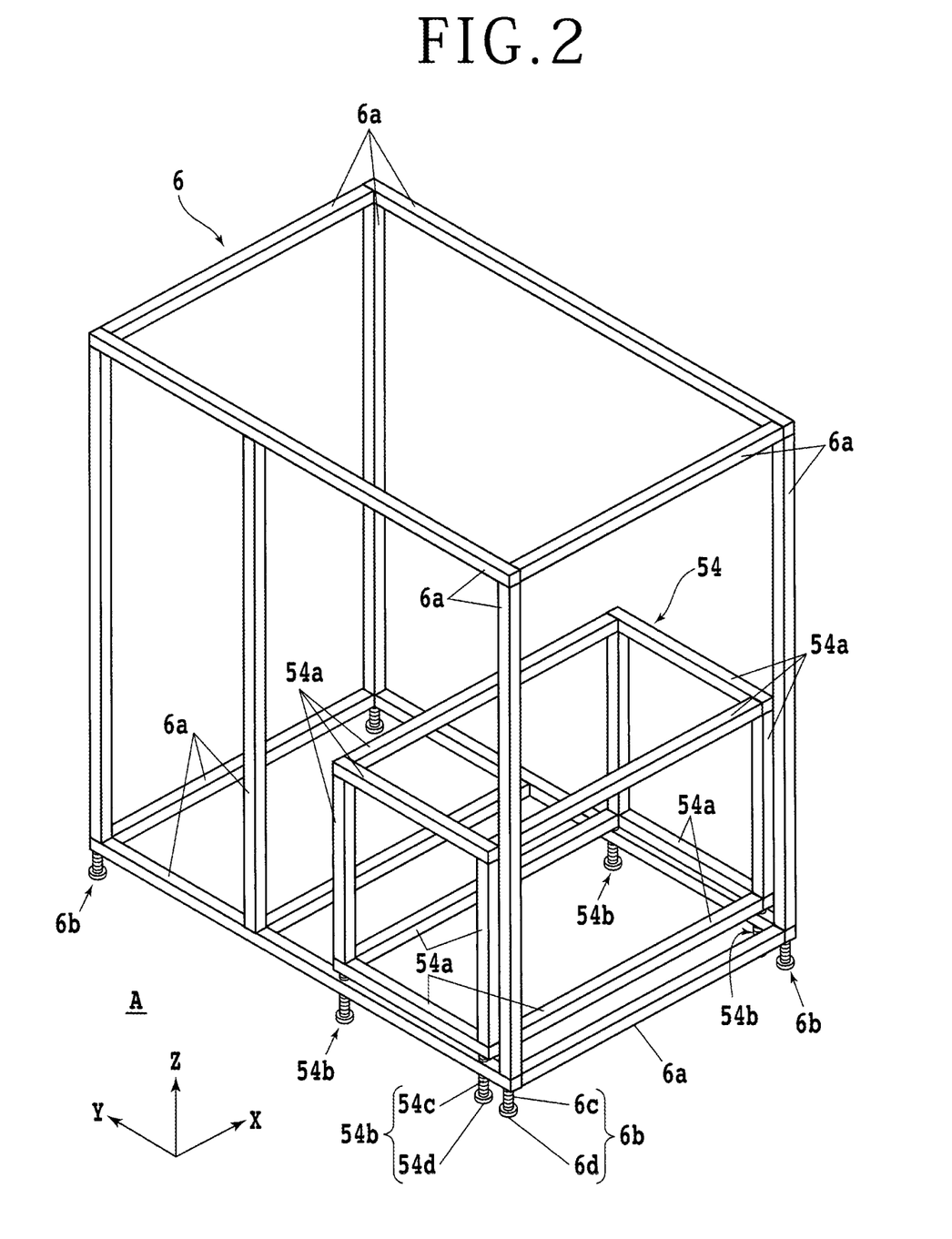
FIG. 2 is a perspective view of a first base and a second base.

In general, the suction source is a fluid machine that generates a negative pressure by rotating rotary blades, vanes, or the like. Hence, operating the suction source causes the suction apparatus 52 to vibrate. The constituent elements of the suction apparatus 52 are supported by a second base 54 formed by assembling framework pieces 54a into a rectangular parallelepiped shape (see FIG. 2). FIG. 2 is a perspective view of the first base 6 and the second base 54. A second space having a rectangular parallelepiped shape defined by the second base 54 is smaller than the first space defined by the first base 6. The second base 54 is disposed at a front lower part in the first space of the first base 6.

Figure 3:
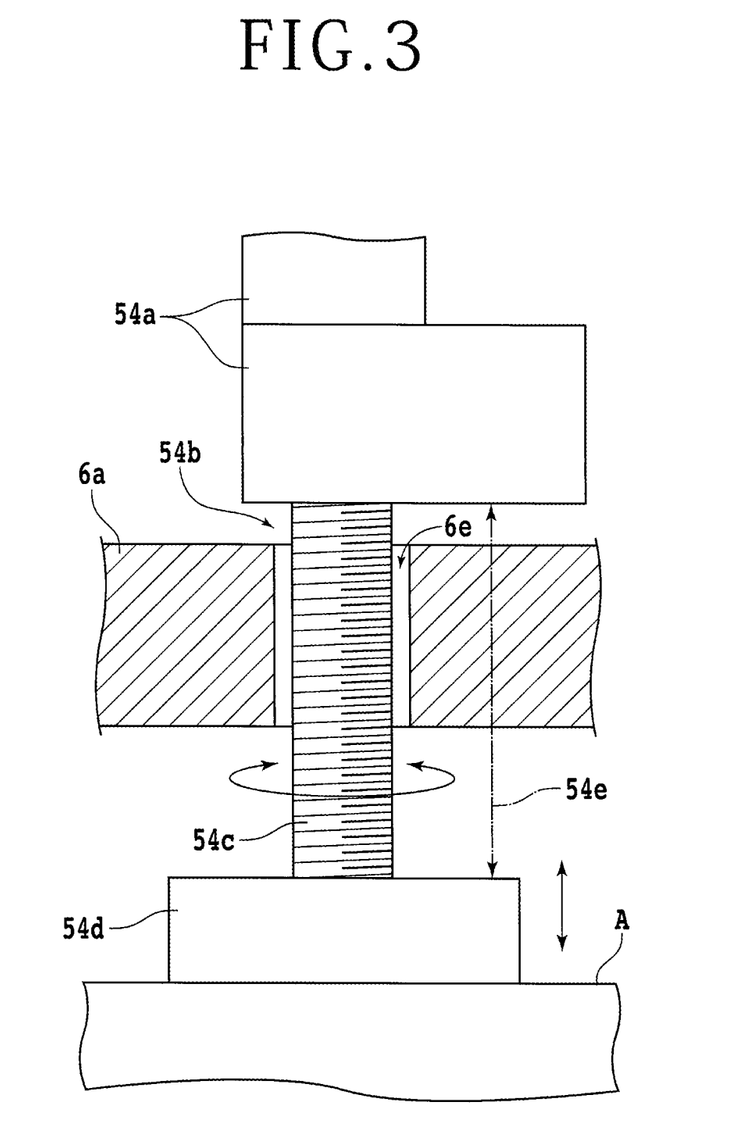
FIG. 3 is a partially sectional side view of a vicinity of a through-hole of the first base.

An exterior cover, a door part, and so forth for configuring a casing are disposed also at a side part and a top part of the second base 54. In FIG. 2, however, the exterior cover, the door part, and so forth are omitted. A leg part 54b is disposed at each of four corners of a bottom part of the second base 54. Each leg part 54b is disposed in such a manner as to penetrate through a through-hole 6e provided in the corresponding framework piece 6a of the first base 6 (see FIG. 3). FIG. 3 is a partially sectional side view of a vicinity of the through-hole 6e of the first base 6. As illustrated in FIG. 3, a diameter of the through-hole 6e is larger than that of a shaft part 54c of the leg part 54b, and the shaft part 54c can be inserted into the through-hole 6e without getting contact with the framework piece 6a (that is, the first base 6).

A spiral groove is formed in a side surface of the shaft part 54c, and the shaft part 54c is rotatably coupled to a screw hole (not illustrated) formed in the corresponding framework piece 54a. A protrusion length 54e of the shaft part 54c with respect to the framework piece 54a is changed by rotating the shaft part 54c. A circular plate-shaped pedestal part 54d that gets contact with the floor surface A in a room such as a clean room is secured to a bottom part of the shaft part 54c. Each pedestal part 54d is located on the lower side relative to each framework piece 6a. For example, when an operator rotates the pedestal part 54d by a tool, the shaft part 54c is rotated and the protrusion length 54e is extended or contracted.

Figure 4:
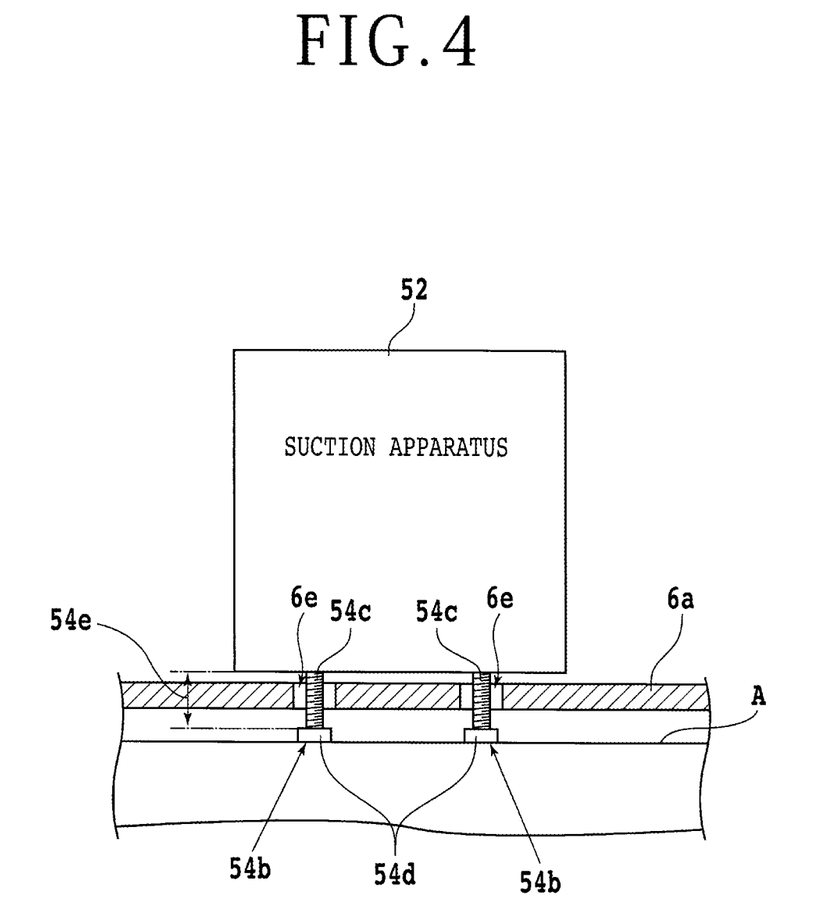
FIG. 4 is a partially sectional side view of a suction apparatus and so forth installed on a floor surface.

FIG. 4 is a partially sectional side view of the suction apparatus 52 and so forth installed on the floor surface A. When the grinding apparatus 4 and the suction apparatus 52 are to be installed on the floor surface A, the leg parts 6b of the grinding apparatus 4 are disposed on the floor surface A. In addition, the protrusion length 54e of each shaft part 54c is extended as illustrated in FIG. 4. This causes the suction apparatus 52 to be supported on the floor surface A via the leg parts 54b. In particular, the second base 54 stands by itself without getting contact with the first base 6. Further, the framework pieces 54a and the exterior cover of the second base 54 are not in contact with the framework pieces 6a, the exterior cover, and so forth of the first base 6, and the shaft parts 54c of the second base 54 are also not in contact with the framework pieces 6a of the first base 6 in the through-holes 6e.

Therefore, even when the suction apparatus 52 is operated, vibrations transmitted from the suction apparatus 52 to the grinding apparatus 4 can be reduced compared with a case in which the second base 54 is in contact with the first base 6. In contrast, when the grinding apparatus 4 and the suction apparatus 52 are to be conveyed, by contracting the protrusion length 54e of the respective shaft parts 54c of the second base 54, the pedestal parts 54d are lifted up from the floor surface A, and the second base 54 is supported by the first base 6.

Figure 5:
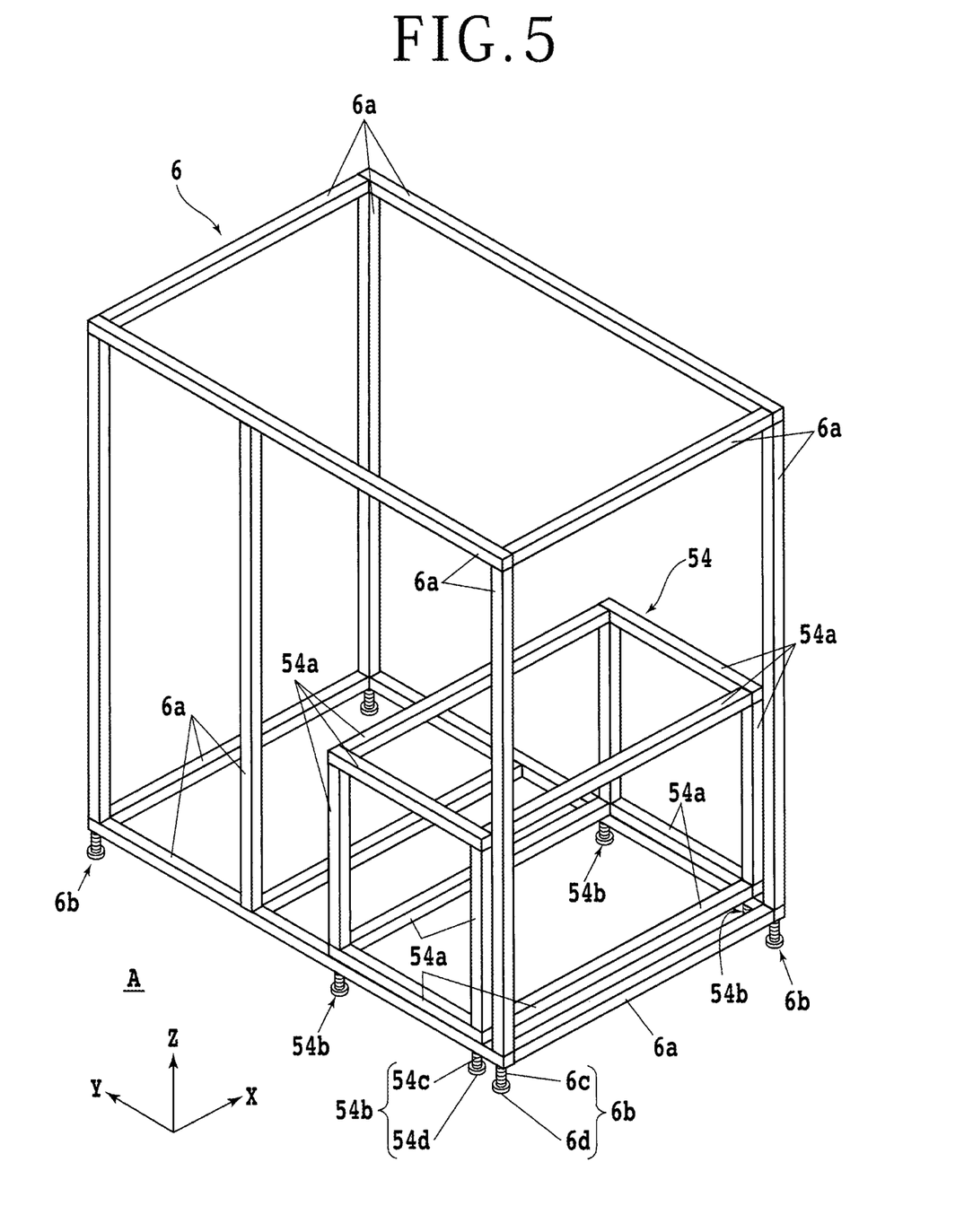
FIG. 5 is a perspective view of the first base and the second base when a grinding apparatus and the suction apparatus are integrally conveyed.
Figure 6:
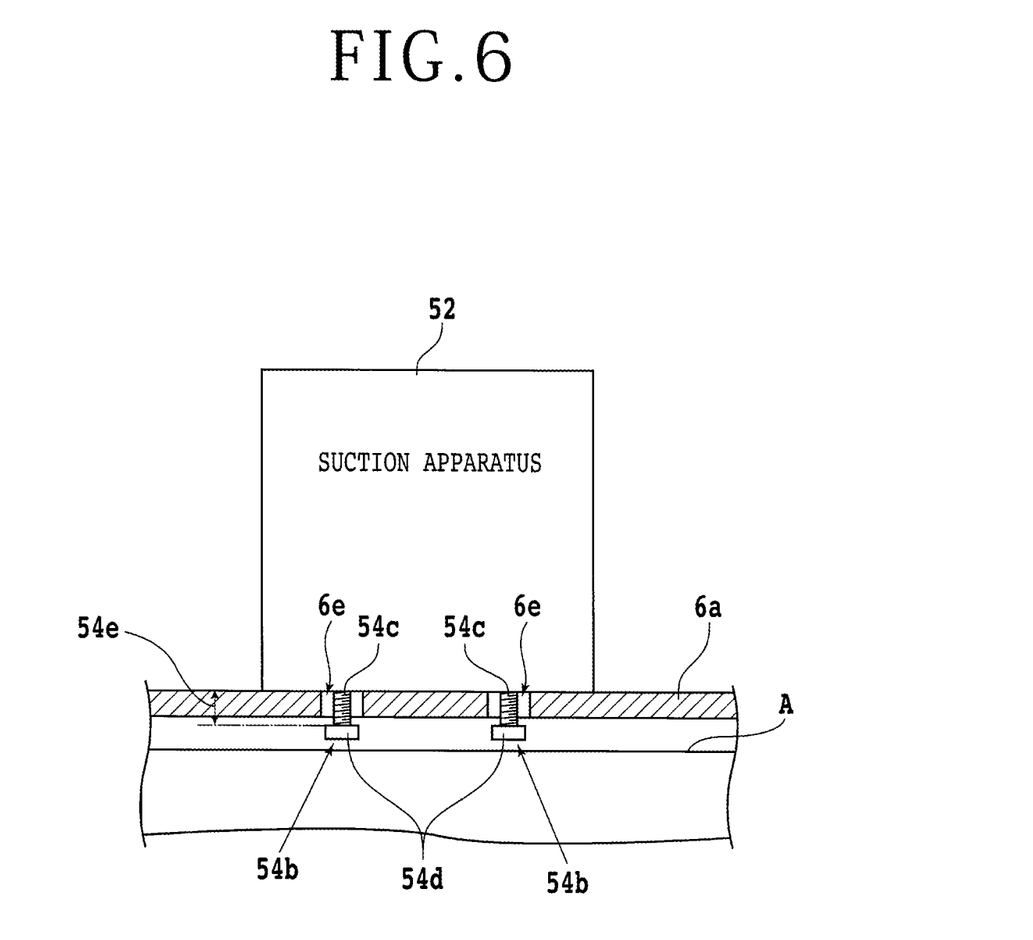
FIG. 6 is a partially sectional side view of the suction apparatus supported by the first base.

FIG. 5 is a perspective view of the first base 6 and the second base 54 when the grinding apparatus 4 and the suction apparatus 52 are integrally conveyed. FIG. 6 is a partially sectional side view of the suction apparatus 52 supported by the first base 6. In the present embodiment, the grinding apparatus 4 and the suction apparatus 52 can integrally be packed and conveyed in the state in which both are properly connected by conduit parts, electrical wiring lines, and so forth. Therefore, there is an advantage that connection work can be omitted and the time and effort of packing can also be reduced. Vibrations transmitted through the conduit parts, the electrical wiring lines, and so forth are sufficiently small compared with the magnitude of vibrations transmitted in a case in which the framework pieces 6a and 54a are in contact with each other, and can be ignored.

The grinding equipment 2 has a controller (not illustrated) that controls operation of the grinding apparatus 4 and the suction apparatus 52. For example, the controller is configured by a computer including a processor (processing device) typified by a central processing unit (CPU) and a memory (storing device). The storing device includes a main storing device such as a dynamic random access memory (DRAM), a static random access memory (SRAM), or a read only memory (ROM) and an auxiliary storing device such as a flash memory, a hard disk drive, or a solid-state drive. Predetermined software is stored in the auxiliary storing device. Functions of the controller are implemented by causing the processing device and so forth to operate in accordance with this software.

As described above, in the grinding equipment 2 of the present embodiment, when the grinding apparatus 4 and the suction apparatus 52 are to be conveyed, the suction apparatus 52 is supported by the first base 6 of the grinding apparatus 4 by contracting the protrusion length 54e of the respective shaft parts 54c to support the second base 54 by the first base 6. In contrast, when the grinding apparatus 4 and the suction apparatus 52 are to be installed on the floor surface A, by extending the protrusion length 54e of the respective shaft parts 54c, the second base 54 is caused to stand by itself independently of the first base 6 without getting contact with the first base 6. Therefore, vibrations transmitted from the suction apparatus 52 to the grinding apparatus 4 can be reduced.

Besides, structures, methods, and so forth according to the above-described embodiment can be carried out with appropriate changes without departing from the scope of the object of the present invention. For example, as the above-described processing apparatus, a polishing apparatus, a single-point cutting apparatus, a cutting apparatus, or a laser processing apparatus (none is illustrated) may be employed in place of the grinding apparatus 4.

Modification Example 1

The case in which a polishing apparatus is employed as the processing apparatus will be described. The polishing apparatus has a polishing unit (processing unit). Constituent elements of the polishing apparatus, such as the polishing unit and a chuck table, are supported by the above-described first base 6. The polishing unit has a spindle disposed along the Z-axis direction. A rotational drive source such as a motor is disposed near an upper end part of the spindle, and a polishing wheel having a circular plate shape is mounted to a lower end part of the spindle with an interposition of a mount having a circular plate shape. That is, the polishing wheel (processing tool) is mounted to the spindle with the interposition of the mount.

The polishing wheel has a circular plate-shaped platen in contact with the mount. A polishing pad is secured to a lower surface side of the platen. The polishing pad includes (i) abrasive grains formed of diamond or the like, and (ii) a pad part including foam resin, non-woven fabric or the like for securing the abrasive grains thereto. When the wafer 11 is to be polished, first, one surface side of the wafer 11 is held under suction by the chuck table having a circular plate shape. Then, the other surface side of the wafer 11 is polished by rotating the chuck table and lowering at a predetermined processing feed rate the polishing wheel that rotates around the spindle.

Modification Example 2

Next, the case in which a single-point cutting apparatus is employed as the processing apparatus will be described. The single-point cutting apparatus has a single-point cutting unit (processing unit). Constituent elements of the single-point cutting apparatus, such as the single-point cutting unit and a chuck table, are supported by the above-described first base 6. The single-point cutting unit has a spindle disposed along the Z-axis direction.

A rotational drive source such as a motor is disposed near an upper end part of the spindle, and a single-point cutting wheel having a circular plate shape is mounted to a lower end part of the spindle with an interposition of a mount having a circular plate shape. That is, the single-point cutting wheel (processing tool) is mounted to the spindle with the interposition of the mount. The single-point cutting wheel has a base of a circular plate shape, and a cutting edge formed of diamond or the like is secured to a lower surface side of the base. The chuck table of the single-point cutting apparatus has a substantially flat holding surface, and the holding surface is disposed substantially in parallel to the XY plane. Moreover, the chuck table can be processing-fed along the X-axis direction by a movement mechanism of a ball screw system.

When single-point cutting is executed for the wafer 11, first, one surface side of the wafer 11 is held under suction by the chuck table having a circular plate shape. Then, the cutting edge of the single-point cutting wheel that rotates around the spindle is positioned to a predetermined height. Then, single-point cutting is executed for the other surface side of the wafer 11 by executing processing feed of the chuck table from an outside of the single-point cutting unit toward a position directly under the single-point cutting unit in the X-axis direction.

Modification Example 3

Next, the case in which a cutting apparatus is employed as the processing apparatus will be described. The cutting apparatus has a cutting unit (processing unit). Constituent elements of the cutting apparatus, such as the cutting unit and a chuck table, are supported by the above-described first base 6. The cutting unit can be indexing-fed along the Y-axis direction and be cutting-in-fed along the Z-axis direction. The cutting unit has a spindle disposed along the Y-axis direction.

A rotational drive source such as a motor is disposed near a base end part of the spindle, and a cutting blade having an annular cutting edge is mounted to a tip part of the spindle with an interposition of a circular cylindrical mount. That is, the cutting blade (processing tool) is mounted to the spindle with the interposition of the mount. The cutting blade may be either a hub type or a hub-less type (what is generally called a washer type). The cutting blade has the annular cutting edge. The cutting edge is formed by securing abrasive grains formed of diamond, cBN, or the like, with use of a bond material of metal, resin, a vitrified material, or the like. The chuck table of the cutting apparatus also has a substantially flat holding surface, and the holding surface is disposed substantially in parallel to the XY plane. Moreover, the chuck table can be processing-fed along the X-axis direction by a movement mechanism of a ball screw system.

When the wafer 11 is to be cut, first, one surface side of the wafer 11 is held under suction by the chuck table having a circular plate shape. Then, a lower end of the cutting blade that rotates around the spindle is positioned to a predetermined height. By executing processing feed of the chuck table relative to the cutting blade in this state, the wafer 11 is cut. By the cutting, a half-cut groove that does not reach the one surface (lower surface) from the other surface (upper surface) or a fully-cut groove that reaches the one surface from the other surface is formed in the wafer 11.

Modification Example 4

Next, the case in which a laser processing apparatus is employed as the processing apparatus will be described. The laser processing apparatus has a laser beam irradiation unit (processing unit). Constituent elements of the laser processing apparatus, such as the laser beam irradiation unit and a chuck table, are supported by the above-described first base 6. The laser beam irradiation unit includes a laser oscillator. The laser oscillator has Nd:YAG, Nd:YVO$_4$, or the like as a laser medium, for example. A pulsed laser beam having such a wavelength as to be transmitted through the wafer 11 (for example, 1064 nm when the wafer 11 is a silicon single-crystal wafer) is emitted from the laser oscillator.

The laser beam may be converted to a predetermined harmonic through a nonlinear optical crystal. For example, the wavelength of the laser beam is converted to such a wavelength as to be absorbed by the wafer 11 (355 nm when the wafer 11 is a silicon single-crystal wafer). The laser beam irradiation unit includes an irradiation head having a collecting lens, and the wafer 11 is irradiated with the laser beam from the irradiation head in such a manner that the laser beam is focused on a height position corresponding to the wafer 11 held under suction on a holding surface of the chuck table.

The chuck table has the substantially flat holding surface, and the holding surface is disposed substantially in parallel to the XY plane. Moreover, the chuck table can be processing-fed along the X-axis direction and be indexing-fed along the Y-axis direction by a movement mechanism of a ball screw system. When laser processing is to be executed for the wafer 11, first, one surface side of the wafer 11 is held under suction by the chuck table having a circular plate shape.

Then, the focal point of the laser beam is positioned to the inside of the wafer 11 or the vicinity of the other surface of the wafer 11. By executing processing feed of the chuck table relative to the focal point in this state, laser processing is executed for the wafer 11. When the laser beam has such a wavelength as to be transmitted through the wafer 11, a modified region in which mechanical strength has lowered is formed in the vicinity of the focal point. When the laser beam has such a wavelength as to be absorbed by the wafer 11, ablation processing of a region in the vicinity of the focal point is caused.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. Processing equipment comprising:
   a processing apparatus including a chuck table that holds a workpiece under suction and a processing unit that processes the workpiece held under suction by the chuck table;
   a suction apparatus that supplies a negative pressure to the chuck table;
   a first base that supports the processing apparatus; and
   a second base that supports the suction apparatus, wherein
   the second base has, at a bottom part thereof, multiple leg parts that are disposed in such a manner as to penetrate through through-holes provided in the first base, without getting contact with the first base, and are each capable of extension and contraction,
   the second base is allowed to be supported by the first base through contracting of a protrusion length of each of the multiple leg parts when the processing apparatus and the suction apparatus are to be conveyed, and
   the second base stands by itself without getting contact with the first base, through extending of the protrusion length of each of the multiple leg parts when the processing apparatus and the suction apparatus are to be installed on a floor surface.

2. The processing equipment according to claim 1, wherein each of the multiple leg parts has a shaft part in which a spiral groove is formed, and rotating each shaft part allows a change in protrusion length of each shaft part.

3. The processing equipment according to claim 1, wherein the processing unit has a spindle and processes the workpiece held under suction by the chuck table, with use of a processing tool mounted to the spindle, or has a laser beam irradiation unit and processes the workpiece held under suction by the chuck table, by irradiating the workpiece with a laser beam.

\* \* \* \* \*